United States Patent [19]

Stubbings

[11] 4,422,543

[45] Dec. 27, 1983

[54] UNIVERSAL CONVEYOR

[75] Inventor: James H. Stubbings, Rockville, Md.

[73] Assignee: Potomac Applied Mechanics, Inc., Bethesda, Md.

[21] Appl. No.: 910

[22] Filed: Jan. 3, 1979

[51] Int. Cl.³ ............................................. B65G 13/00
[52] U.S. Cl. .................... 198/782; 193/35 C; 198/785
[58] Field of Search ............... 198/780, 782, 785, 789, 198/790, 791, 824, 835, 842; 193/37, 35 B, 35 C; 29/115, 124, 125, 130, 121.1

[56] References Cited

U.S. PATENT DOCUMENTS

| | | |
|---|---|---|
| 1,518,836 | 12/1924 | Casel . |
| 1,707,998 | 4/1929 | Shaw .................................. 198/824 |
| 2,664,215 | 12/1953 | Bottenhorn . |
| 2,667,261 | 1/1954 | Berger . |
| 2,717,071 | 9/1955 | Cook .................................. 198/842 |
| 2,860,766 | 11/1958 | Welter ................................ 198/780 |

FOREIGN PATENT DOCUMENTS

| | | |
|---|---|---|
| 480330 | 1/1952 | Canada ............................... 198/785 |
| 2718737 | 3/1978 | Fed. Rep. of Germany . |
| 485006 | 9/1917 | France ................................ 193/37 |
| 2152448 | 4/1973 | France . |
| 360628 | 10/1973 | Sweden . |
| 616200 | 7/1978 | U.S.S.R. ............................. 198/780 |

Primary Examiner—Jeffrey V. Nase
Attorney, Agent, or Firm—Cushman, Darby & Cushman

[57] ABSTRACT

A conveyor system that can readily transport I-beams, angle irons, T-beams, channel members, and like components without any modifications to the system being necessary. The system includes a plurality of sets of roller pairs, each roller being contoured so that it has various surfaces that will accept components and properly engage them for transport. Each pair of rollers is mounted for rotation about a common axis, and a power actuated structure is provided for adjusting the spacing between the rollers of each pair to accommodate components of different sizes.

18 Claims, 7 Drawing Figures

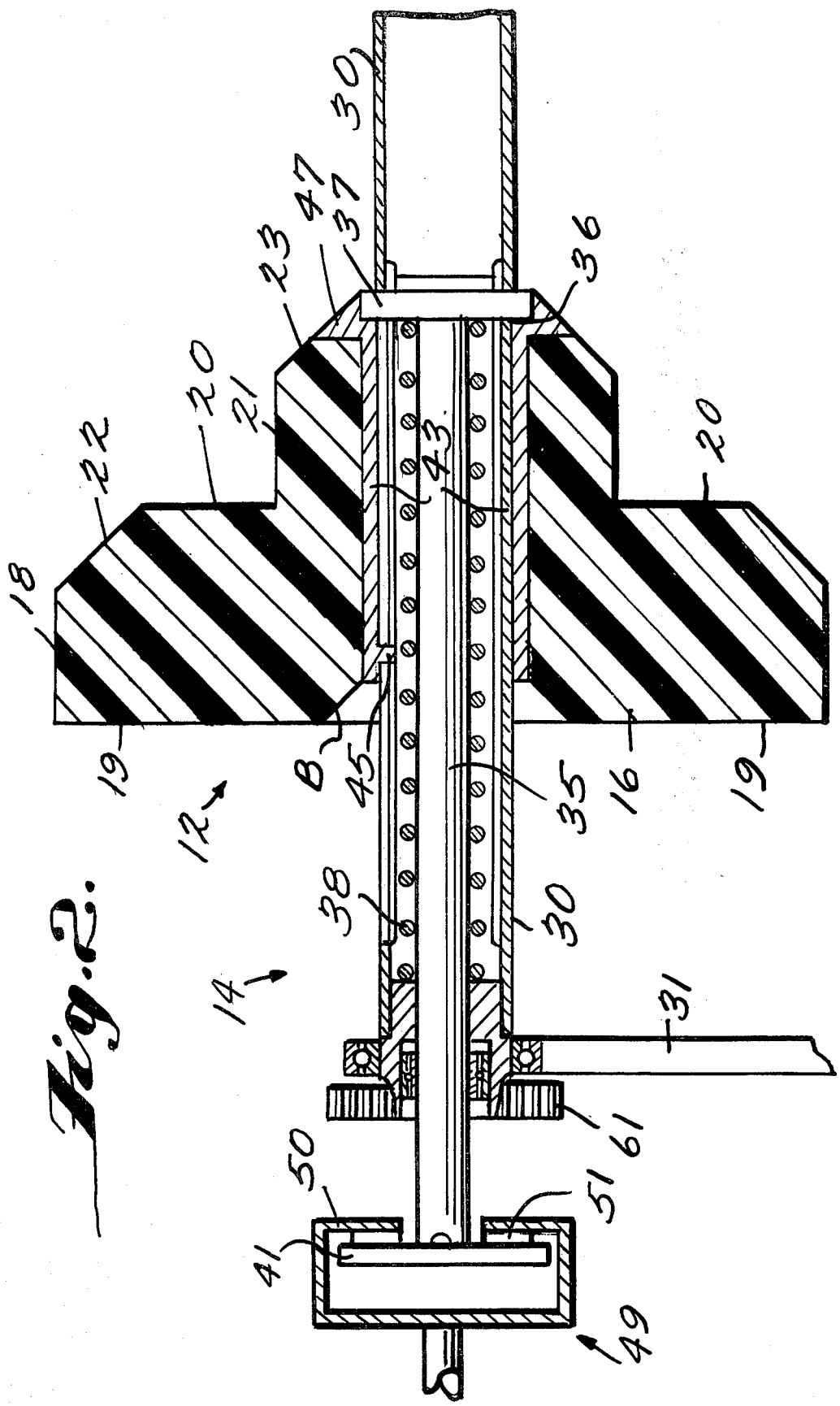

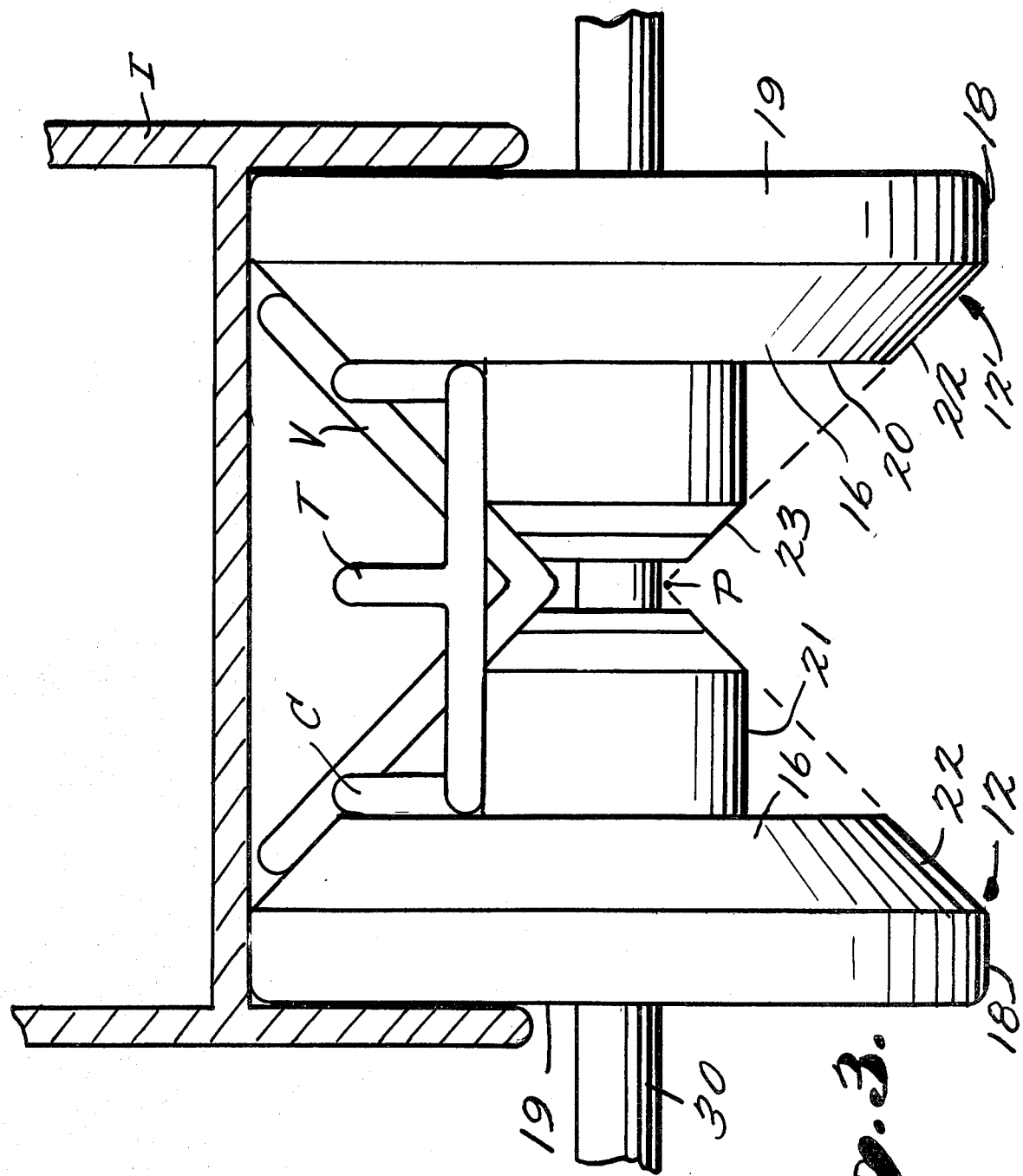

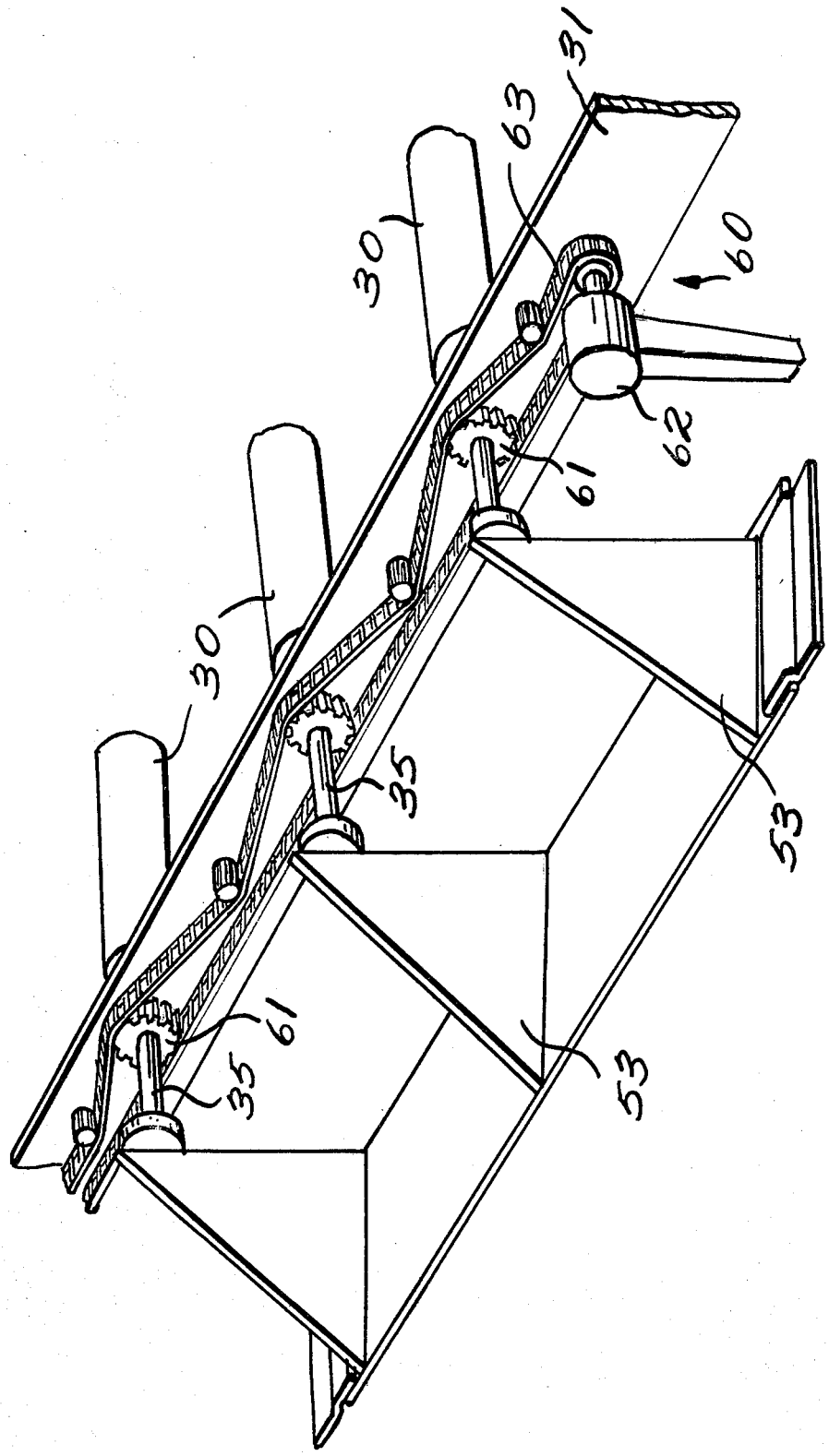

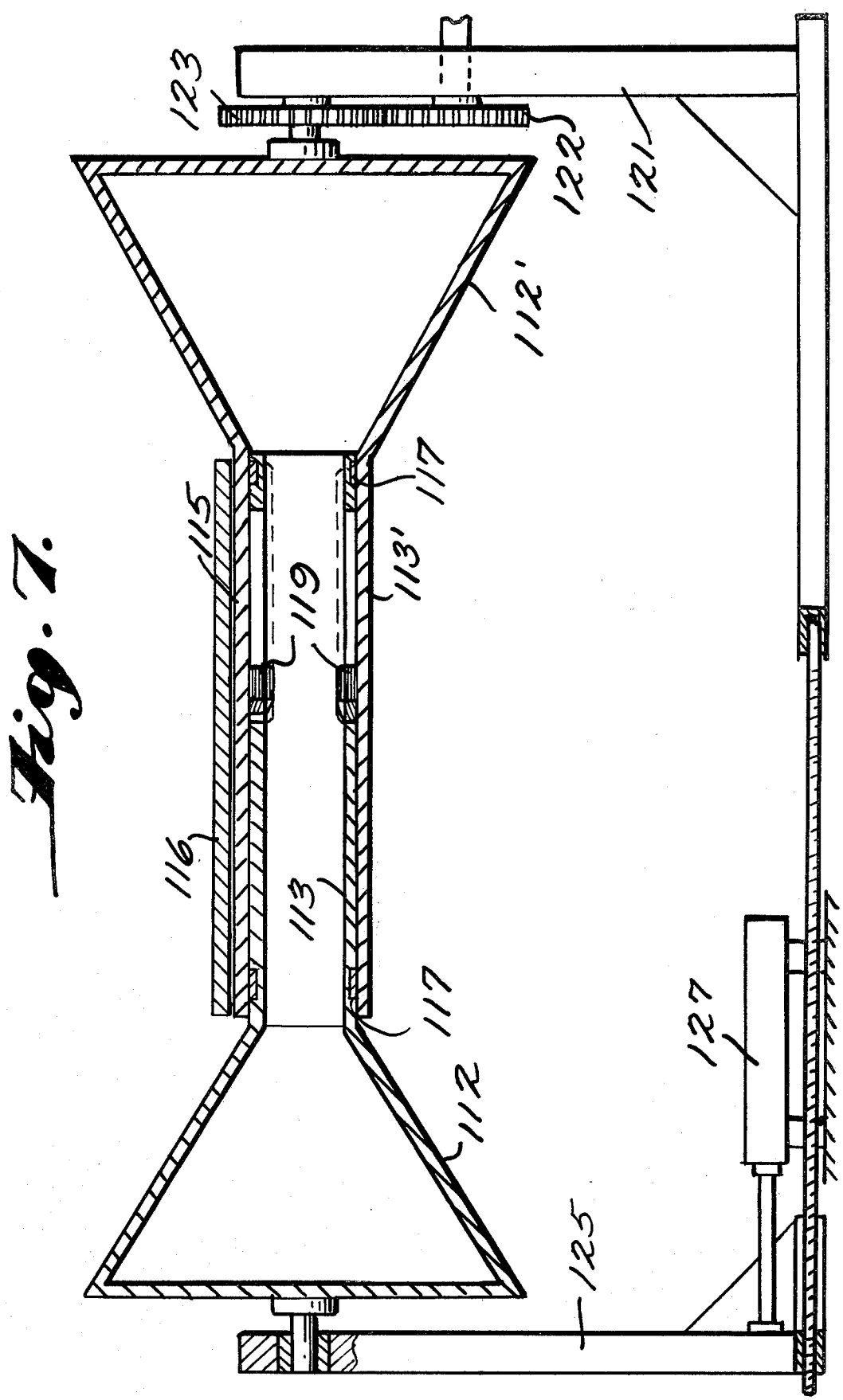

UNIVERSAL CONVEYOR

BACKGROUND AND SUMMARY OF THE INVENTION

There are many situations in which it is desirable to be able to transport a plurality of differently shaped elongated components without the necessity of changing over from one conveying system to another. For instance, conventional structural steel fabricating machines, such as the "Mubea-Matic" manufactured by Muhr und Bender Attendorn, and "Easy-Cut Bar Shear" manufactured by Ehrichs Manufacturing Co. of Fargo, N.D., are capable of cutting and fabricating a wide variety of structural steel components such as I-beams, angle irons, T-beams, channel members, and the like. However, when one switches over from processing one type of component to another type of component (e.g., angle irons to channel members), it is common practice to make numerous changes to the conveyor system, or replace the conveyor system entirely, for feeding components to the machinery. This is an expensive and time-consuming activity, both in the feeding of structural steel fabricating machinery and in other situations.

There have been proposals in the past, such as provided in U.S. Pat. Nos. 2,667,261 and 2,860,766, for conveying differently shaped components utilizing the same basic conveying system. However, such prior art systems have not normally been capable of properly transporting structural components of all shapes (particularly I-beams and channel members) and in order to change over from conveying one type of component to another or components of different sizes, it is normally necessary to provide for a manual adjustment of the conveying components.

According to the present invention, a conveying system and associated method of conveyance are provided that are capable of properly and efficiently conveying structural components of all conventional shapes without any modifications whatsoever to the conveyor components. Additionally, according to the present invention, the conveying components are adjustable by automatic means to provide the proper spacing to carry components of all different sizes. According to the present invention, it is possible to interchangeably convey I-beams, angle irons, T-beams, channel members, and like components utilizing a conveyor system including sets of pairs of axially spaced rollers. This is accomplished by automatically adjusting the axial spacing of the rollers of each pair to accommodate a component to be fed thereby; conveying the component to a desired position utilizing the conveyor system; and changing the component being conveyed without modification of the conveyor system, insuring only that the axial spacing of the rollers of each pair is appropriate.

According to one aspect of the present invention, a conveyor roller is provided comprising a generally tubular body member, including means defining an axial bore extending through the body member. The body member further includes a radially outermost generally axially extending peripheral surface; a generally radially extending first end surface; a generally radially extending second surface; a radially innermost generally axially extending peripheral surface; and a radially slanting outer surface. The radially outermost generally axially extending peripheral surface extends between the first surface and the radiallly slanting surface, and the second surface extends between the radially slanting surface and the radially innermost generally axially extending peripheral surface. The body member is preferably composed of hard rubber (the term "hard rubber" as used in the present specification and claims is intended to mean all materials having conveyance properties comparable to hard rubber) with key means formed on the interior of the axial bore by a metal sleeve, and the roller body member preferably further includes a radially slanting inner surface, the radially slanting inner surface extending from the radially innermost generally axially extending peripheral surface, and providing a linear continuation of the radially slanting outer surface. A conveyance system utilizing such a roller preferably includes first and second said rollers with means for mounting the rollers for rotation about a common axis. The rollers are disposed on the mounting means so that geometric extensions of the radially slanting surfaces of each of the rollers intersect at a point between the rollers.

According to another aspect of the present invention, a conveyance system is provided which includes first and second rollers, means for mounting the rollers for rotation about a common axis, surface means formed on the rollers, the surface means including a radially slanting surface associated with each roller, geometric extensions of the surfaces intersecting at a point between the rollers; and positioning means operatively connected to the rollers for automatically adjusting the axial positions of the rollers with respect to each other. For conveyance of bulk type materials, each of the first and second rollers includes a tubular sleeve extending axially therefrom toward the other of the rollers, the tubular sleeves telescopically engaging each other and providing an exterior surface for receipt of a conveyor belt. For universal conveyance of structural elongated components and the like, the rollers are mounted by a common tubular shaft, and the positioning means include an interior rod associated with each roller, each interior rod disposed generally interiorly of the common shaft and extending axially outwardly from the common shaft at one end thereof, and including means for operatively engaging it associated roller. In either case, power means are activated to axially move the rollers with respect to each other depending upon the bulk of the material or the size of the structural components to be conveyed thereby.

It is the primary object of the present invention to provide for the conveyance of a wide variety of components and materials without necessity for change in the conveying system structure, and with automatic adjustment depending upon the size of the components or materials conveyed. This and other objects of the invention will become clear from an inspection of the detailed description of the invention and from the appended claims.

BRIEF DESCRIPTION OF THE DRAWINGS

FIG. 2 is a detail view partly in cross-section and partly in elevation of an exemplary roller according to the present invention, with mounting components therefor;

FIG. 3 is a side detail view of two cooperating rollers in a conveyor system shown in cooperative relationship with a wide variety of structural components;

FIG. 6 is a perspective view illustrating a common driving arrangement for powering a plurality of sets of rollers in a conveyor system according to the invention; and FIG. 7 is a cross-sectional view of an exemplary bulk conveyor system arrangement according to the invention.

DETAILED DESCRIPTION OF THE DRAWINGS

Figure 1:
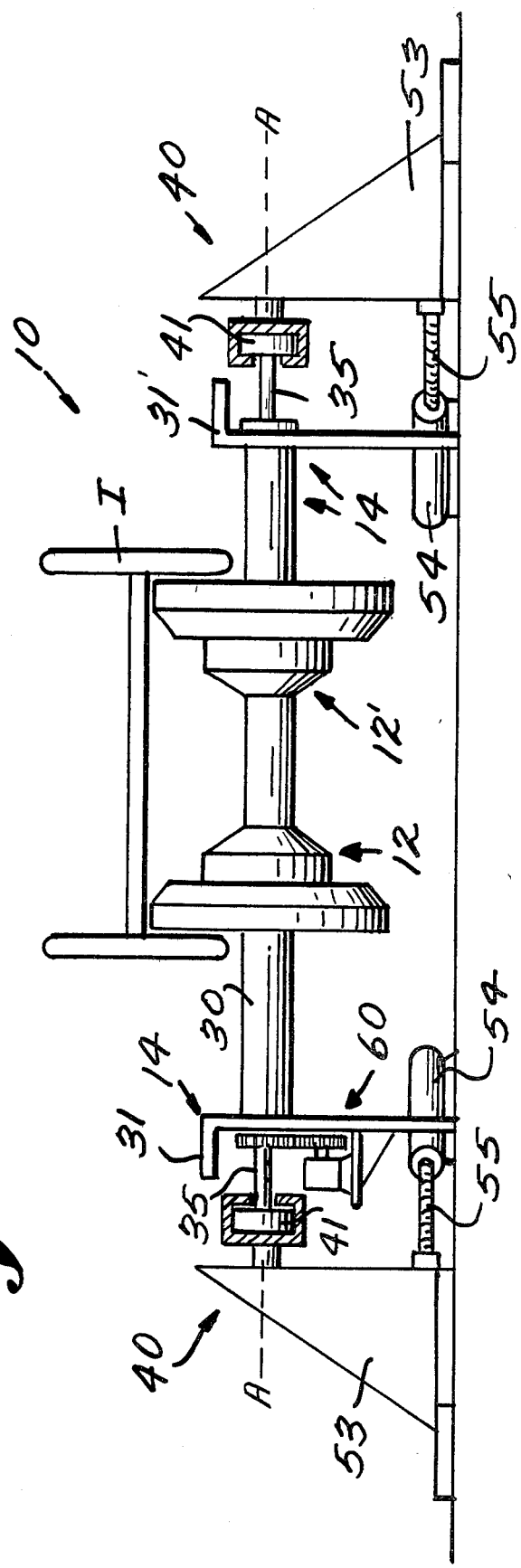
FIG. 1 is a side view of an exemplary conveyor system according to the present invention for conveying I-beams and like structural components.

An exemplary conveying system according to the present invention is shown generally at 10 in FIG. 1. The system includes first and second rollers 12, 12', with means 14 for mounting the rollers for rotation about a common axis A—A. The rollers 12, 12' are specially shaped to convey a wide variety of elongated structural components and the like, such as I-beams, angle irons, T-beams, channel members, and the like, without the necessity of replacement or modification of the components.

Exemplary rollers 12, 12' according to the present invention are shown most clearly in FIGS. 2 and 3. Each roller 12, 12' comprises a generally tubular body member 16 which includes means defining an axial bore B (see FIG. 2) extending through the body member 16. The body member 16 further includes a radially outermost generally axially extending peripheral surface 18; a generally radially extending first end surface 19; a generally radially extending second surface 20; a radially innermost generally axially extending peripheral surface 21; and a radially slanting outer surface 22. The surface 18 extends between the surfaces 19 and 22, and the surface 22 extends between the surfaces 18 and 20, while the surface 20 extends between the surfaces 22 and 21. Additionally, a radially slanting inner surface 23 also is preferably provided especially for the conveyance of angle irons, although in situations where the axial length of the surface 21 is short enough the surface 23 need not be provided. The surface 23 is preferably a linear continuation of the surface 22. In the conveyance system 10, the rollers 12, 12' are mounted by the mounting means 14 so that geometric extensions of the radially slanting surfaces (22, 23) of each of the rollers 12, 12' intersect at a point between the rollers (e.g., point P in FIG. 3).

FIG. 3 shows the rollers 12, 12' in use for conveying a wide variety of conventional structural components. For instance, an I-beam I is readily conveyed thereby, the surfaces 18 of the rollers 12, 12' engaging the bottom of the cross-component of the I-beam I, and the surfaces 19 guiding and/or engaging inner surfaces of the side components of the I-beam I. T-beams, such as T-beam T, are conveyed by engagement of the surfaces 21 on the bottom thereof, and channel members C may be conveyed in a like member, or channel members may be conveyed in the same manner as the I-beams I, with the flat surface of the channel member on top. Flat stock can be conveyed also by the surfaces 21. Angle irons V are conveyed by engagement of the surfaces 22, 23 therewith, and square tubing would similarly be conveyed by such surfaces. Also, rounds and pipe may be conveyed by the surfaces 22 and/or 23.

Figure 5:
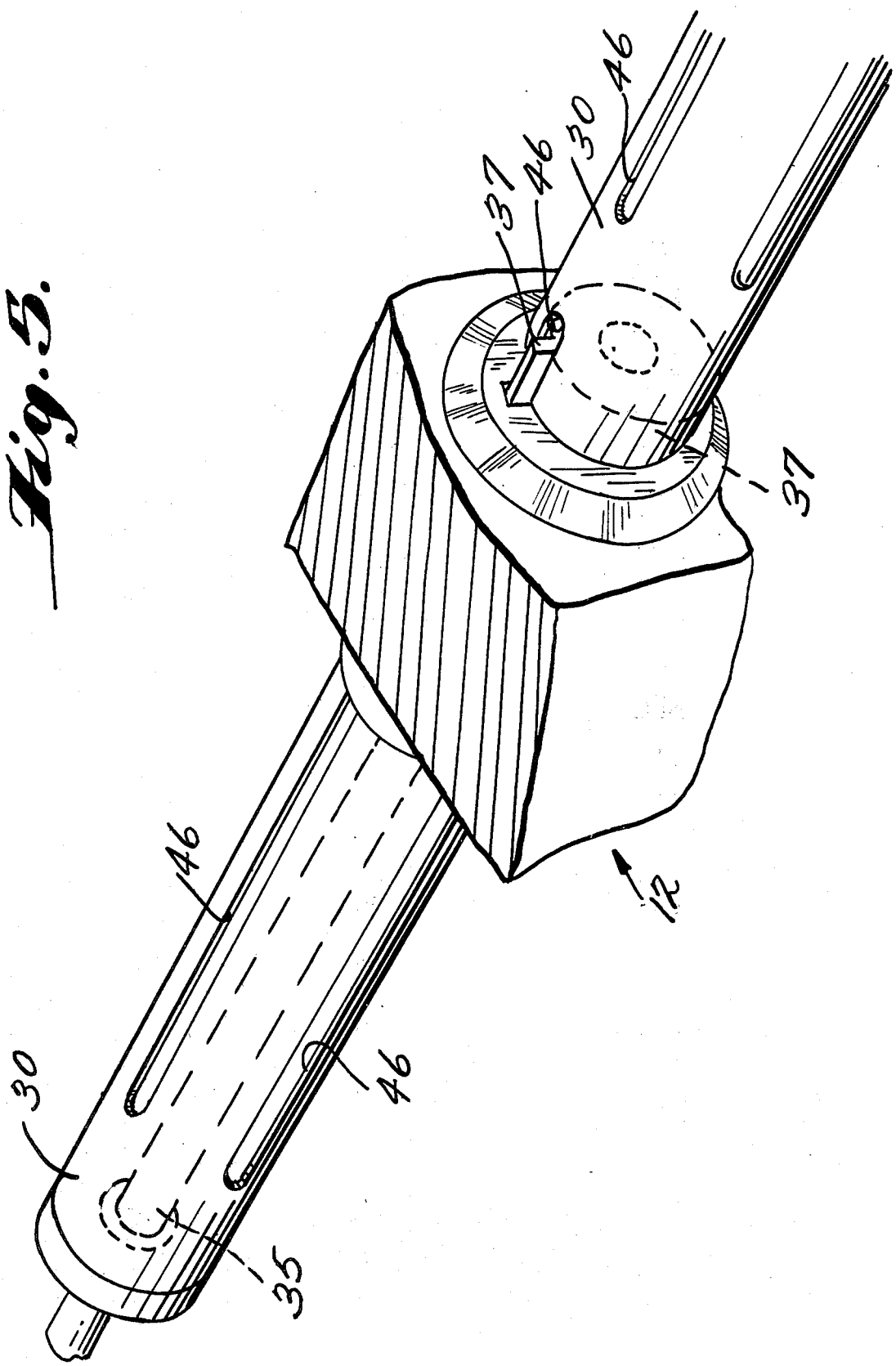
FIG. 5 is a perspective detail view of an exemplary shaft for use in the conveying system of FIGS. 1-3.

Positioning means are provided operatively connected to the rollers 12, 12' for automatically adjusting the axial positions of the rollers with respect to each other. (Compare FIGS. 1 and 3 spacing.) The mounting means 14 preferably comprises a generally tubular common shaft 30 mounted by bearings at the ends thereof in upstanding stationary structural components 31, 31' (see FIG. 1) or the like. The positioning means, as shown most clearly in FIGS. 1, 3, and 5, comprises an interior rod 35 associated with each roller 12, 12', each interior rod disposed generally interiorly of the shaft 30 and extending axially outwardly therefrom at one end thereof, and including means, such as a pin or weld 36 (see FIG. 2) between a radially extending bar 37 or the like at the interior end of the rod 35. Spring means 38 may be provided for biasing the rollers 12, 12' axially inwardly toward each other, and power means 40 are provided for engaging the ends 41 of the rods 35 that extend axially outwardly from the shaft 30, for effecting axial movement of the rods 35.

Figure 4:
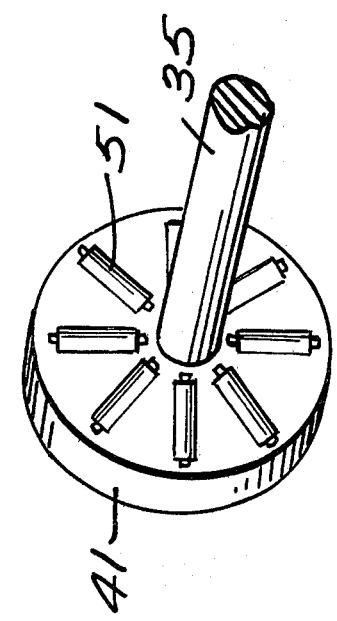
FIG. 4 is a detail perspective view of exemplary bearing means that may be provided on interior rods for axially adjusting the spacing of the rollers according to the invention.

The rollers 12, 12' are preferably made of hard rubber and include key means for allowing axial movement along the shaft 30 while providing for rotational movement of the rollers 12, 12' with the shaft 30. The key means preferably comprises a metal sleeve 43 (see FIG. 2) formed interiorly of the bore B, with key members 45 extending therefrom and cooperating with key slots 46 (see FIG. 5) formed in the tube 30. Additionally, the ends of the bar 37 also extend through the key slots 46 so that the rod 35 is axially moveable with respect to the tube 30, and can effect axial movement of the rollers 12, 12'. Additionally, the sleeve 43 also preferably comprises an axially extending abutment surface 47 formed on the opposite side of the surface 22 as the surface 18.

Where mechanical engagement is provided between each rod 35 and its associated roller 12, 12', means are provided for mounting the interior rod 35 for rotation with respect to the power means 40. Such an arrangement, with particular reference to FIGS. 1 and 2, preferably comprises an actuating component 49 including surface 50 which abuts the end 41 of the rod 35, roller bearing 51 (see FIG. 4), or like bearing means, being provided between the member 41 and the surface 50. The power means 40 in general include the means 49 which are operatively attached to a moveable support 53 (see FIG. 1) or the like which is axially moveable by a motor 54 or the like which is operatively connected to a stationary component 31, 31', a lead screw 55 or like device transforming rotational movement of the motor 54 into linear movement of the support 53. Alternatively, a fluid actuated piston or other structure may be provided in place of the motor 54 and lead screw 55.

Drive means 60 (see FIGS. 1 and 6 in particular) are provided for rotating the common shaft 30, the drive means preferably comprising gear means, such as a gear 61, mounted at at least one end of the common shaft 30, an interior shaft 35 extending axially through the gear means 61 (see FIG. 2). A motor 62 (see FIG. 6) is provided for powering the gear means 61, and preferably the conveying system includes a plurality of sets of rollers, each set mounted for rotation about a different common axis, the motor 62 and a driving chain 63 (see FIG. 6) or the like comprising means for driving all of the rollers of all of the sets at substantially the same speed.

For the conveyance of bulk materials, the first and second rollers 112, 112' take the form illustrated in FIG. 7; namely, conical members with elongated tubular sleeves 113, 113' extending axially therefrom toward the other of the rollers, the tubular sleeves 113, 113' telescopically engaging each other and providing an exterior surface 115 for receipt of a conveyor belt 116 or the like. A Teflon bearing 117, or like antifriction bearing means, is provided between the tubular sleeves 113, 113'. Key means 119 also are provided for keying the tubular sleeves 113, 113' together.

The embodiment of FIG. 7 also includes a stationary support 121, drive means for rotating the rollers about the common axis thereof, the drive means including gears 122, 123 (gear 122 being powered) associated with the stationary support 121, and operatively connected to the first roller 112'. The positioning means in this embodiment comprises a moveable support 125 for the second roller 112 mounted for guided axial movement with respect to the stationary support 121, and power means—such as hydraulic piston 127—for automatically moving the moveable support 125 axially with respect to the stationary support 121.

OPERATION

The apparatus of FIGS. 1–6 is useful for interchangeably conveying I-beams I, angle irons V, T-beams T, channel members C, and like components. While the conveying system 10 can be utilized for a wide variety of functions, it is especially useful with conventional numerically controlled structural steel fabricating machines such as the "Mubea-Matic".

In utilizing the conveyor system 10 to transport, for example I-beams I, the motors 54 are actuated to move the structures 53 axially outwardly or inwardly so that the rollers 12, 12' are spaced the proper distance for carrying the I-beams I (see FIG. 1). The surfaces 50 associated with the power means 40 engage the bearings 51 on the end plates 41 of the rods 35 to effect the axially outward movement, while the spring means 38 maintain the rollers 51 of the end plates 41 in engagement with the surfaces 50 and bias the rollers 12, 12' inwardly to the inwardmost position allowed by the positioning of the surfaces 50. During axial movement of the rollers 12, 12', the rods 35 transmit the moving force through the bars 37 which slide in key ways 36 and tube 30, to the respective roller 12, 12', which is guided in its movement by keys 45 also riding in key slots 46.

Once the desired axial spacing has been reached, and even during movement of the rollers 12, 12' to obtain the optimum axial spacing, the motor 62 is driving the shafts 30 through the gears 31 and chains 63, so that when an I-beam I is brought into contact with the rollers 12, 12', it is conveyed thereby. In order to change over the conveyor system 10 to other structural components, it is not necessary to make any modifications to the conveyor system aside from the proper axial positioning of the rollers 12, 12' as heretofore explained, the surface configurations of the rollers 12, 12' being adaptable to carry structural components of all sizes thereon.

Thus, it will be seen that according to the present invention, a conveyor system and method of operation thereof have been provided which allow for the adaptability of the conveyor system to components and materials of a wide variety of sizes automatically, and which allow the conveyance of I-beams, angle irons, T-beams, channel members, and like structural components without any modification to the conveyor components whatsoever. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, systems, and methods.

What is claimed is:

1. A conveyor roller comprising a generally tubular body member of hard rubber, including means defining an axial more extending through the body member; a radially outermost generally axially extending peripheral surface; a generally radially extending first end surface; a generally radially extending second surface; a radially innermost generally axially extending peripheral surface; and a radially slanting outer surface; said radially outermost generally axially extending peripheral surface extending between said first surface and said radially slanting surface, and said second surface extending between said radially slanting surface and said radially innermost generally axially extending peripheral surface; key means formed on the interior of said axial bore, and including a metal sleeve, said metal sleeve having an axially extending abutment surface formed on the opposite side of said radially slanting outer surface as said radially outermost generally axially extending surface.

2. A conveying system including
a first roller;
a second roller;
each of said first and second rollers includes a tubular sleeve extending axially therefrom toward the other of said rollers, and said tubular sleeves telescopically engaging each other and providing an exterior surface for receipt of a conveyor belt;
means for mounting said rollers for rotation about a common axis;
surface means formed on said rollers, said surface means including a radially slanting surface associated with each said roller, geometric extensions of said surface intersecting at a point between said rollers; and
positioning means operatively connected to said rollers for automatically adjusting the axial positions of said rollers with respect to each other.

3. A conveying system as recited in claim 2 further comprises key means for keying said tubular sleeves together.

4. A conveying system as recited in claim 2 further comprising anti-friction bearing means provided between said tubular sleeves.

5. A conveying system as recited in claim 2 further comprising a stationary support; drive means for rotating said rollers about said common axis thereof, said drive means operatively connected to said stationary support and said first roller; and wherein said positioning means comprises a movable support for said second roller mounted for guided axial movement with respect to said stationary support, and power means for automatically moving said movable support axially with respect to said stationary support.

6. A conveying system including
a first roller;
a second roller;

means for mounting said rollers for rotation about a common axis, including a generally tubular common shaft;

surface means formed on said rollers, said surface means including a radially slanting surface associated with each said rollers, geometric extensions of said surface intersecting at a point between said rollers, and positioning means operatively connected to said rollers for automatically adjusting the axial positions of said rollers with respect to each other, said positioning means comprising an interior rod associated with each roller, each interior rod disposed generally interiorly of said common shaft and extending axially outwardly from said common shaft at one end thereof, and including means for operatively engaging its associated roller.

7. A conveying system as recited in claim 6 wherein said positioning means further comprises power means for engaging the end of each interior rod extending axially outwardly from said common shaft for effecting axial movement of said interior rods.

8. A conveying system as recited in claim 7 further comprising means for mounting said interior rods for rotation with respect to said power means.

9. A conveying system including
a first roller;
a second roller;
means for mounting said rollers for rotation about a common axis defined by a powered shaft;
surface means formed on said rollers, said surface means including a radially slanting surface associated with each said roller, geometric extensions of said surface intersecting at a point between said rollers;
positioning means operatively connected to said rollers for automatically adjusting the axial positions of said rollers with respect to each other along said powered shaft; and
wherein said means for mounting said rollers for rotation about a common axis include a generally tubular common shaft; and wherein said positioning means comprise an interior rod associated with each roller, each interior rod disposed generally interiorly of said common shaft and extending axially outwardly from said common shaft at one end thereof, and including means for operatively engaging its associated roller.

10. A conveying system as recited in claims 6 or 9 further comprising a stationary support for supporting said common shaft at each end thereof, and wherein said positioning means further comprises spring means extending between said stationary support and each interior rod for biasing said rollers generally axially toward each other.

11. A conveying system as recited in claim 9 further comprising drive means for rotating said common shaft, said drive means including gear means mounted at at least one end of said common shaft, one of said interior shafts extending axially through said gear means.

12. A conveying system as recited in claim 9 wherein each of said rollers is keyed to said common shaft by key means; and wherein said means for operatively engaging its associated roller of each of said interior rods includes a radially outwardly extending member; and wherein said common shaft includes key slots formed therein, said key means and said radially outwardly extending member cooperating with said key slots.

13. A conveying system comprising
a first and a second roller, with means for mounting said rollers for rotation about a common axis including a generally tubular common shaft;
each of said rollers comprising a generally tubular body member, including means defining an axial bore extending through the body member; a radially outermost generally axially extending peripheral surface; a generally radially extending first end surface; a generally radially extending second surface; a radially innermost generally axially extending peripheral surface; and a radially slanting outer surface; said radially outermost generally axially extending peripheral surface extending between said first surface and said radially slanting surface, and said second surface extending between said radially slanting surface and said radially innermost generally axially extending peripheral surface;
said rollers disposed on said mounting means so that geometric extensions of said radially slanting surfaces of each of said rollers intersect at a point between said rollers; and
positioning means operatively connected to said rollers for automatically adjusting the axial positions of said rollers with respect to each other, said positioning means comprising an interior rod associated with each roller, each interior rod disposed generally interiorly of said common shaft and extending axially outwardly from said common shaft at one end thereof, and including means for operatively engaging its associated roller.

14. A conveying system as recited in claim 13 wherein said positioning means further comprises power means for engaging the end of each interior rod extending axially outwardly from said common shaft for effecting axial movement of said interior rods.

15. A conveying system as recited in claim 13 wherein each of said rollers is keyed to said common shaft by key means; and wherein said means for operatively engaging its associated roller of each of said interior rods includes a radially outwardly extending member; and wherein said common shaft includes key slots formed therein, said key means and said radially outwardly extending member cooperating with said key slots.

16. A conveying system as recited in claim 15 wherein said body member of each of said rollers is composed of hard rubber, and wherein said key means associated with each of said rollers includes a metal sleeve having a key portion in operative engagement with a said key slot.

17. A conveying system as recited in claim 13 wherein each roller body member further includes a radially slanting inner surface, said radially slanting inner surface extending from said radially innermost generally axially extending peripheral surface, and providing a linear continuation of said radially slanting outer surface.

18. A conveying system as recited in claim 13 further comprising a plurality of sets of said rollers, each set mounted for rotation about a different common axis; and power means for driving all of the rollers of all of the sets at substantially the same speed.

* * * * *